(12) United States Patent
Kim et al.

(10) Patent No.: US 8,848,783 B2
(45) Date of Patent: Sep. 30, 2014

(54) MOTION PICTURE ENCODING/DECODING APPARATUS, AND APPARATUS AND METHOD FOR ADAPTIVE OVERLAPPED BLOCK MOTION COMPENSATION BY VARIABLE UNIT FOR SAME

(75) Inventors: Hayoon Kim, Gyeonggi-do (KR); Yungho Choi, Gyeonggi-do (KR); Yoonsik Choe, Gyeonggi-do (KR); Yonggoo Kim, Seoul (KR); Byongho Kim, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 603 days.

(21) Appl. No.: 13/123,693

(22) PCT Filed: Oct. 6, 2009

(86) PCT No.: PCT/KR2009/005688
§ 371 (c)(1),
(2), (4) Date: May 5, 2011

(87) PCT Pub. No.: WO2010/044559
PCT Pub. Date: Apr. 22, 2010

(65) Prior Publication Data
US 2011/0206114 A1    Aug. 25, 2011

(30) Foreign Application Priority Data

Oct. 13, 2008    (KR) .................. 10-2008-0100285

(51) Int. Cl.
*H04B 1/66*    (2006.01)
*H04N 7/12*    (2006.01)
*H04N 11/02*    (2006.01)
*H04N 11/04*    (2006.01)
*G06K 9/46*    (2006.01)
*G06K 9/36*    (2006.01)
*H04N 19/583*    (2014.01)

(52) U.S. Cl.
CPC .................... *H04N 7/363* (2013.01)
USPC ............ 375/240.02; 375/240.08; 375/240.12; 375/240.15; 375/240.16; 375/240.24; 382/240

(58) Field of Classification Search
None
See application file for complete search history.

(56) References Cited

U.S. PATENT DOCUMENTS

| 6,359,929 B1 | 3/2002 | Boon |
| 6,754,269 B1 * | 6/2004 | Yamaguchi et al. ....... 375/240.1 |
| 2005/0175102 A1 | 8/2005 | Ha |

(Continued)

OTHER PUBLICATIONS

International Search Report mailed Jun. 1, 2010 for PCT/KR2009/005688.

*Primary Examiner* — Joseph Ustaris
*Assistant Examiner* — Ellyar Y Barazesh
(74) *Attorney, Agent, or Firm* — Lowe Hauptman & Ham, LLP

(57) ABSTRACT

The present disclosure relates to a video encoding/decoding apparatus, and apparatus and method for adaptive overlapped block motion compensation by variable units for same. The apparatus and the method for adaptive overlapped block motion compensation by variable units, according to the present disclosure, when conducting a motion compensation, enable an encoder to perform an adaptive overlapped block motion compensation for a plurality of predetermined scan modes and sampling modes, and enable the encoder to calculate the computation volume occurring in said compensation and residual pixel energy, estimate the performance for each mode based on the calculation, determine an optimum scan mode and an optimum sampling mode, thus enabling a decoder to perform a motion compensation with optimum performance and less computing volume based on the determined mode.

17 Claims, 10 Drawing Sheets

(56) References Cited

U.S. PATENT DOCUMENTS

2005/0207664 A1* 9/2005 Ramasastry et al. .......... 382/240
2006/0193388 A1 8/2006 Woods et al.
2007/0064803 A1* 3/2007 Miao et al. ................ 375/240.16
2011/0142132 A1* 6/2011 Tourapis et al. .......... 375/240.16

* cited by examiner (a) SCAN MODE 1

(b) SCAN MODE 2

(c) SCAN MODE 3

(d) SCAN MODE 4

(e) SCAN MODE 5

(f) SCAN MODE 6

(g) SCAN MODE 7

(h) SCAN MODE 8

MOTION PICTURE ENCODING/DECODING APPARATUS, AND APPARATUS AND METHOD FOR ADAPTIVE OVERLAPPED BLOCK MOTION COMPENSATION BY VARIABLE UNIT FOR SAME

CROSS REFERENCE TO RELATED APPLICATION

This application claims the priority of Korean Patent Application No. 10-2008-0100285, filed on Oct. 13, 2008, in the KIPO (Korean Intellectual Property Office), the disclosure of which is incorporated herein in their entirety by reference. Further, this application is the National Phase application of International Application No. PCT/KR2009/005688, filed Oct. 6, 2009, which designates the United States and was published in Korean. Each of these applications is hereby incorporated by reference in their entirety into the present application.

TECHNICAL FIELD

The present disclosure relates to a video data compression/decompression technique. More particularly, the present disclosure relates to a video data encoding/decoding apparatus, and apparatus and method for adaptive overlapped block motion compensation (OBMC) by variable units for the same wherein the disclosure suppresses an excessive computation for carrying out the adaptive OBMC while resolving a blurring artifact or an over-smoothing problem accompanied to further improve the performance of the video data compression and, in particular, the adaptive OBMC is not operated by the fixed units such as block unit, boundary unit, and pixel unit but variably determined units effectively by the video characteristics.

BACKGROUND ART

The statements in this section merely provide background information related to the present disclosure and may not constitute prior art.

Generally, the most currently existing commercial video compression methods and their apparatuses effectively remove temporal redundancies which are present in natural videos by using a block motion estimation/compensation method and an apparatus thereof. Such a block motion estimation/compensation method is based on an assumption that all the pixels in a block basically have the same motion, and performs a prediction/reconstruction on the respective block pixels of the subject current image to be encoded by using previously compressed and transmitted image(s). Propelled by the simple but efficient basic assumption, the block motion compensation has a little motion parameters to encode and transmit, and thereby makes a significant contribution to improving the compression efficiency of video data. However, this method involves blocking artifacts caused by a lack of conformity that some pixels (normally at block boundaries) in the blocks do not conform to a basic model, wherein the blocking artifact means unsightly latticed artificial coding errors observed at the respective block boundaries. In order to solve the blocking artifacts, many conventional techniques have become available, and the overlapped block motion compensation is one of them.

The technique of overlapped block motion compensation is performed in motion reconstructions for the respective blocks by a weighted addition of the reconstructed current location pixels based on motions of adjacent blocks to reconstructed pixels in a current block as a way of reflecting the motions of the adjacent blocks in the motion reconstruction of the current block, whereby errors in the motion reconstruction at the block boundaries are effectively and significantly reduced. However, in the case where the motions of the adjacent block are significantly deviated from the current block, the motion reconstruction by the overlapped block motion compensation is known to show a greater deterioration than the typical block motion reconstruction or cause blurring artifacts which blur edge information of the blocks. This phenomenon is often called over-smoothing problem, which occurs when the relatively correctly predicted pixel values at the block boundaries under the well satisfied assumption with the block motion estimation method undergo a weighted addition to pixels in the adjacent blocks having a critical error caused by the overlapped block motion reconstruction. Generally, the reason for showing a significant difference between motions of two adjacent blocks is because the most of the pixels in the respective blocks have disparities in actual motions which are caused by the different imaged objects of possibly different dynamic natures within the video. Therefore, such over-smoothing problem generally occurs to the in-video objects at their edges which happen to be extra important video information, and thus resolving the over-smoothing problem is important in further improving the video compression performance and obtaining an even higher quality reconstructed video.

To solve such over-smoothing problem, there exist prior arts in the form of various techniques that mostly address the motion reconstruction of the respective blocks by adaptively applying, via selecting between, the overlapped block motion compensation and the typical block motion compensation. According to Ji Zhongwei, Jiang Wenjun, and Zhu Weile ("Wavelet-based video coding using adaptive overlapped block motion compensation", in Proc. ICCCS'02, 29 Jun.-1 Jul., 2002, vol. 2, pp. 1090-1093), encoding is performed as the respective blocks are tried with the overlapped block motion compensation and the conventional block motion compensation, and then mean-squared errors for the respective methods are compared to select one that has a lower value. Though this technique could have attained an improved motion reconstruction performance by way of time-processing always in a method with less errors in motion compensation, a decoder is not allowed to reproduce the mean-squared errors for the respective methods which the encoder used in its selection, necessitating transmission of a form of additional information as to the method for motion-reproducing the respective blocks and the consequent bit rate of the information may pointedly deteriorate the overall compression performance.

There are various types of prior arts to perform an adaptive overlapped block motion compensation while handling the problematic increase of bit rate with the extra information transmission, and firstly Tien-ying Kuo and C.-C. Jay Kuo ("A hybrid BMC/OBMC motion compensation scheme", in Proc. ICIP'97, 26-29 Oct. 1997, vol. 2, pp. 795-798) suggested to obtain a displaced frame difference from two previously decoded images based on which the motion compensation methods were switched. In particular, a decoder with no extra information was made to adaptively select between the block motion compensation and the overlapped block motion compensation by allowing the overlapped block motion compensation to be performed only when a differential image block at the same location of the current block for being motion compensated has a number of pixels above a particular threshold. Although this method provided the basis for a selective application of the overlapped block motion compensation method or the typical block motion compensation method in the block unit, such block unit motion compensation upon selection is adapted to perform motion reconstruction on all of the pixels within a block, which disables a motion reconstruction in a finer unit such as on the basis of boundaries of the respective blocks or on the basis of the respective pixels in a block.

This deficiency may be somewhat resolved by a method suggested by Jiro Katto ("Overlapped motion compensation using a window function which varies in response to an input picture", U.S. Pat. No. 5,602,593, Feb. 11 1997) wherein a weight for use in the weighted addition is adjusted by an input image and the statistical characteristics of a motion compensation error. In other words, the value of the weight for use in the overlapped block motion compensation is made variable by the statistical characteristics of a particular video inputted or a particular image of the inputted video, or even a particular boundary of the inputted image with the weight valued '0' directing the typical block motion compensation method, which entitles the suggested method to be an expansion of the conventional block based adaptive motion compensation method for selecting motion reconstruction methods to an even more refined level at the block boundary units. However, since the statistical characteristics referred to in this method as being the basis for adjusting the weight mean the inputted images, or a statistical standard deviation and correlation belonged to a group of pixels corresponding to a part of an image, and a statistic expectation of the motion reconstruction errors, there is a significant computation volume required for their estimations with an inability to expand towards the overlapped block motion compensation by the pixel units short of becoming a more refined type of the adaptive technique.

An example of a conventional method for adjusting the overlapped block motion compensation by the pixel units was suggested by Chih-lung Bruce Lin, Ming-Chieh Lee, and Wei-ge Chen ("Overlapped motion compensation for object coding", U.S. Pat. No. 5,982,438, Nov. 9 1999) wherein the respective pixels in a single block are subjected to the overlapped block motion compensation only when they belong to the same object as that of the adjacent blocks whereby the over-smoothing problem is resolved. However, this method needs a provision of an object map and a transmission as additional information of the object map, which is hardly generated by the current techniques automatically from natural images and also causes an excessive computation which renders it really impractical for compressed encoding of video information.

DISCLOSURE

Technical Problem

Therefore, the present disclosure has been made for providing a video encoding/decoding apparatus, and apparatus and method for an adaptive overlapped block motion compensation by variable units for the same which allow for reducing an excessive computation volume occurring in decoders while adaptively performing the optimal overlapped block motion compensation method.

Technical Solution

One aspect of the present disclosure provides an adaptive overlapped block motion compensation apparatus by variable units including: a scan mode setter for selecting one of 'i' kinds of preset scan modes; a sampling mode setter for selecting one of 'j' kinds of preset sampling modes; an adaptive overlapped block motion compensator for performing an adaptive overlapped block motion compensation by variable units in i×j kinds of selected scan modes and selected sampling modes; and an optimum mode determiner for determining such modes from the selected scan modes and the i×j kinds of the selected sampling modes that generate least residual pixel energy to computation cost as an optimum scan mode and an optimum sampling mode, based on a result of the adaptive overlapped block motion compensation.

For example, the adaptive overlapped block motion compensator may perform a first adaptive overlapped block motion compensation for conducting block motion compensations (BMC) or overlapped block motion compensations (OBMC) on pixels sampled out of a current block in the selected sampling modes with resultant transitions from the first adaptive overlapped block motion compensation possibly occurring between BMC and OBMC to perform a sampling in the selected sampling modes on the pixels extending from a first pixel corresponding to BMC (or OBMC) to a second pixel corresponding to OBMC (or BMC), and the adaptive overlapped block motion compensator may perform a second adaptive overlapped block motion compensation on the pixels after the sampling with a resultant transition from the second adaptive overlapped block motion compensation possibly occurring from and to BMC and OBMC between a leading pixel and a trailing pixel neighboring the leading pixel to perform a sampling in the selected sampling modes on following pixels of the pixels from the trailing pixel and thereafter, and the adaptive overlapped block motion compensator may perform the first adaptive overlapped block motion compensation on the following pixels after the sampling.

Alternatively, the adaptive overlapped block motion compensator may perform a first adaptive overlapped block motion compensation for conducting block motion compensations (BMC) or overlapped block motion compensations (OBMC) on pixels sampled out of a current block in the selected sampling modes with resultant transitions from the first adaptive overlapped block motion compensation possibly occurring between BMC and OBMC to perform a second adaptive overlapped block motion compensation on each of the pixels extending from a first pixel corresponding to BMC (or OBMC) to a second pixel corresponding to OBMC (or BMC) with a resultant transition from the second adaptive overlapped block motion compensation possibly occurring from and to BMC and OBMC between a leading pixel and a trailing pixel neighboring the leading pixel to perform a sampling in the selected sampling modes on following pixels of the pixels from the trailing pixel and thereafter, and the adaptive overlapped block motion compensator may perform the first adaptive overlapped block motion compensation on the following pixels after the sampling.

The optimum mode determiner may determine modes with a highest valued performance calculated based on the sum of the entire residual pixels generated when performing the adaptive overlapped block motion compensation on the current block and the number of times of carrying out a discriminant for determining BMC/OBMC, as the optimum scan mode and the optimum sampling mode.

Another aspect of the present disclosure provides an adaptive overlapped block motion compensation method by variable units including: selecting one of 'i' kinds of preset scan modes; selecting one of 'j' kinds of preset sampling modes; performing an adaptive overlapped block motion compensation by variable units in i×j kinds of selected scan modes and selected sampling modes; and determining such modes from the i×j kinds of the selected scan modes and the selected sampling modes that generate the least residual pixel energy to computation cost as an optimum scan mode and an optimum sampling mode, based on a result of the adaptive overlapped block motion compensation.

For example, the step of performing the adaptive overlapped block motion compensation by variable units may include: performing a first adaptive overlapped block motion compensation for conducting block motion compensations (BMC) or overlapped block motion compensations (OBMC) on pixels sampled out of a current block in the selected sampling modes; in response to transitions occurred between BMC and OBMC as a result of the first adaptive overlapped block motion compensation, performing a sampling in the selected sampling modes on pixels extending from a first pixel corresponding to BMC (or OBMC) to a second pixel corresponding to OBMC (or BMC), and performing a second adaptive overlapped block motion compensation on the pixels after the sampling; and in response to a transition occurred from and to BMC and OBMC between a leading pixel and a trailing pixel neighboring the leading pixel as a result of the second adaptive overlapped block motion compensation, performing a sampling in the selected sampling modes on following pixels of the pixels from the trailing pixel and thereafter, and performing the first adaptive overlapped block motion compensation on the following pixels after the sampling.

Alternatively, the step of performing the adaptive overlapped block motion compensation by variable units may include: performing a first adaptive overlapped block motion compensation for conducting block motion compensations (BMC) or overlapped block motion compensations (OBMC) on pixels sampled out of a current block in the selected sampling modes; in response to transitions occurred between BMC and OBMC as a result of the first adaptive overlapped block motion compensation, performing a second adaptive overlapped block motion compensation with respect to each of the pixels extending from a first pixel corresponding to BMC (or OBMC) to a second pixel corresponding to OBMC (or BMC); and in response to a transition occurred from and to BMC and OBMC between a leading pixel and a trailing pixel neighboring the leading pixel as a result of the second adaptive overlapped block motion compensation, performing a sampling in the selected sampling modes on following pixels of the pixels from the trailing pixel and thereafter, and performing the first adaptive overlapped block motion compensation on the following pixels after the sampling.

The step of determining the optimum scan mode and the optimum sampling mode may determine modes with a highest valued performance calculated based on the sum of the entire residual pixels generated when performing the adaptive overlapped block motion compensation on the current block and the number of times of carrying out a discriminant for determining BMC/OBMC, as the optimum scan mode and the optimum sampling mode.

Yet another aspect of the present disclosure provides a video encoding apparatus including: a motion estimator/compensator for selecting one of a block motion compensation (BMC) and an overlapped block motion compensation (OBMC) with respect to pixels of a current block, predicting the pixels into predicted pixel values respectively by carrying out a selected motion compensation through carrying out an adaptive overlapped block motion compensation by variable units according to 'i' kinds of scan modes combined with 'j' kinds of sampling modes, and determining such modes from i×j kinds of the scan modes and the sampling modes that generate the lowest residual pixel energy to computation cost as an optimal scan mode and a sampling mode, based on a result of the adaptive overlapped block motion compensation; a subtractor for subtracting the predicted pixel values respectively of the pixels of the current block from original pixel values respectively of the pixels of the current block to calculate differences for generating residual signals; a transformer for transforming the residual signals into frequency coefficients; a quantizer for quantizing the frequency coefficients; and an encoder for encoding quantized frequency coefficients into a bitstream.

Yet another aspect of the present disclosure provides a video decoding apparatus comprising: an information interpreter for performing interpretations of scan mode information and sampling mode information of a current block; and an adaptive overlapped block motion compensator for performing an adaptive overlapped block motion compensation with respect to sampled pixels based on the scan mode information and sampling mode information after the interpretations and according to the sampling mode information.

For example, the adaptive overlapped block motion compensator may perform a first adaptive overlapped block motion compensation for conducting block motion compensations (BMC) or overlapped block motion compensations (OBMC) on the sampled pixels from the current block with resultant transitions from the first adaptive overlapped block motion compensation possibly occurring between BMC and OBMC to perform a sampling according to the sampling mode information after the interpretations on the pixels extending from a first pixel corresponding to BMC (or OBMC) to a second pixel corresponding to OBMC (or BMC), and the adaptive overlapped block motion compensator may perform a second adaptive overlapped block motion compensation on the sampled pixels with a resultant transition from the second adaptive overlapped block motion compensation possibly occurring from and to BMC and OBMC between a leading pixel and a trailing pixel neighboring the leading pixel to perform a sampling according to the sampling mode information after the interpretations on following pixels of the pixels from the trailing pixel and thereafter, and the adaptive overlapped block motion compensator may perform the first adaptive overlapped block motion compensation on the following pixels after the sampling.

Alternatively, the adaptive overlapped block motion compensator may perform a first adaptive overlapped block motion compensation for conducting block motion compensations (BMC) or overlapped block motion compensations (OBMC) on the sampled pixels from the current block with resultant transitions from the first adaptive overlapped block motion compensation possibly occurring between BMC and OBMC to perform a second adaptive overlapped block motion compensation on each of the pixels extending from a first pixel corresponding to BMC (or OBMC) to a second pixel corresponding to OBMC (or BMC) with a resultant transition from the second adaptive overlapped block motion compensation possibly occurring from and to BMC and OBMC between a leading pixel and a trailing pixel neighboring the leading pixel to perform a sampling according to the sampling mode information after the interpretations on following pixels of the pixels from the trailing pixel and thereafter, and the adaptive overlapped block motion compensator may perform the first adaptive overlapped block motion compensation on the following pixels after the sampling.

Yet another embodiment of the present disclosure provides video decoding method including: performing an interpretation of scan mode information of a current block; performing an interpretation of sampling mode information of the current block; and simultaneously performing a scan on the current block according to the scan mode information after the interpretation and an adaptive overlapped block motion compensation with respect to sampled pixels in accordance with the sampling mode information after the interpretation.

For example, the step of performing the adaptive overlapped block motion compensation may include: performing a first adaptive overlapped block motion compensation for conducting block motion compensations (BMC) or overlapped block motion compensations (OBMC) on pixels sampled out of a current block according to the sampling mode information after the interpretation; in response to transitions occurred between BMC and OBMC as a result of the first adaptive overlapped block motion compensation, performing a sampling according to the sampling mode information after the interpretation on pixels extending from a first pixel corresponding to BMC (or OBMC) to a second pixel corresponding to OBMC (or BMC), and performing a second adaptive overlapped block motion compensation on the pixels after the sampling; and in response to a transition occurred from and to BMC and OBMC between a leading pixel and a trailing pixel neighboring the leading pixel as a result of the second adaptive overlapped block motion compensation, performing a sampling according to the sampling mode information after the interpretation on following pixels of the pixels from the trailing pixel and thereafter, and performing the first adaptive overlapped block motion compensation on the following pixels after the sampling.

Alternatively, the step of performing the adaptive overlapped block motion compensation may include: performing a first adaptive overlapped block motion compensation for conducting block motion compensations (BMC) or overlapped block motion compensations (OBMC) on pixels sampled out of a current block according to the sampling mode information after the interpretation; in response to transitions occurred between BMC and OBMC as a result of the first adaptive overlapped block motion compensation, performing a second adaptive overlapped block motion compensation on each of the pixels extending from a first pixel corresponding to BMC (or OBMC) to a second pixel corresponding to OBMC (or BMC); and in response to a transition occurred from and to BMC and OBMC between a leading pixel and a trailing pixel neighboring the leading pixel as a result of the second adaptive overlapped block motion compensation, performing a sampling according to the sampling mode information after the interpretation on following pixels of the pixels from the trailing pixel and thereafter, and performing the first adaptive overlapped block motion compensation on the following pixels after the sampling.

Advantageous Effects

According to the disclosure, an encoder is adapted to perform the adaptive overlapped block motion compensation in a scan mode and a sampling mode that least generate residual pixel energy to computation cost and a decoder uses this information for applying the BMC/OBMC decision to particular limited pixels sampled by the sampling mode instead of the entire pixels to perform the optimal overlapped block motion compensation by variable units, whereby reducing the calculation volume and the residual signal energy to be encoded significantly to greatly improve the performance of a video compression apparatus and eventually obtain an enhanced video quality for the same bits or amount of information.

MODE FOR INVENTION

Figure 1:
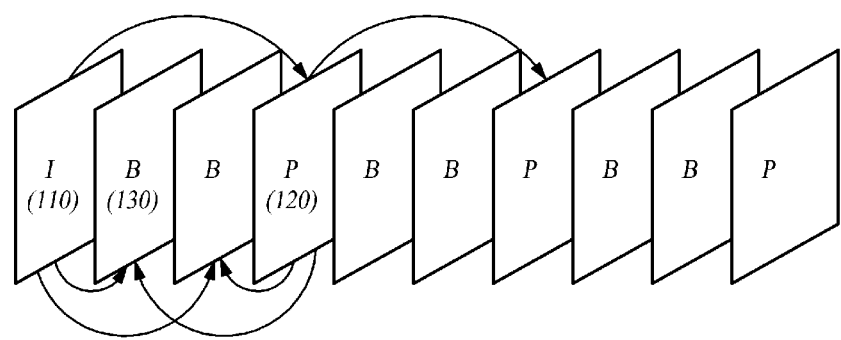
FIG. 1 is a diagram showing video frames comprising a video and being used for an inter prediction between different frames.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear. Also, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Since a video on a screen is composed of as much as thirty frames per second causing a short inter-frame interval, human eyes cannot distinguish between the frames. For this reason, casting the thirty frames within a second will make the observing eyes believe the frames are a continuous movement.

If there is such a similarity between a previous frame and a current frame, it is possible to make a prediction of a pixel value of one frame from a known value of a pixel constituting a preceding frame. This kind of prediction is called an inter prediction and is carried out frame to frame.

Such video data encoding and decoding are performed based on the technology of motion prediction. Motion prediction is carried out in a way of referencing to a past frame on a temporal axis or to both of the past frame and a future frame. The reference frame is a frame that is used as a reference for encoding or decoding a current frame. Additionally, in the block-based video coding, a still image (frame) forming the video is divided by macroblocks and subblocks which constitute the macroblock so that the image is motion-predicted and encoded in units of a block.

Prediction of a next pixel is also possible within a same frame by taking advantage of the correlations among pixel signals, and is called an intra prediction inside a frame.

FIG. 1 is a diagram showing video frames comprising a video and being used for an inter prediction between different frames.

Referring to FIG. 1, video data is consisted of a series of still images. These still images are classified by a group of pictures (GOP). One GOP has an I frame 110, P frames 120, and B frames 130. I frame 110 is adapted to be encoded by itself without using a reference frame, and P frames 120 and B frames 130 are encoded through performing a motion estimation and a compensation using a reference frame. Especially, B frames 130 are encoded by forwardly and backwardly (bidirectional) predicting a past frame and a future frame, respectively.

Figure 2:
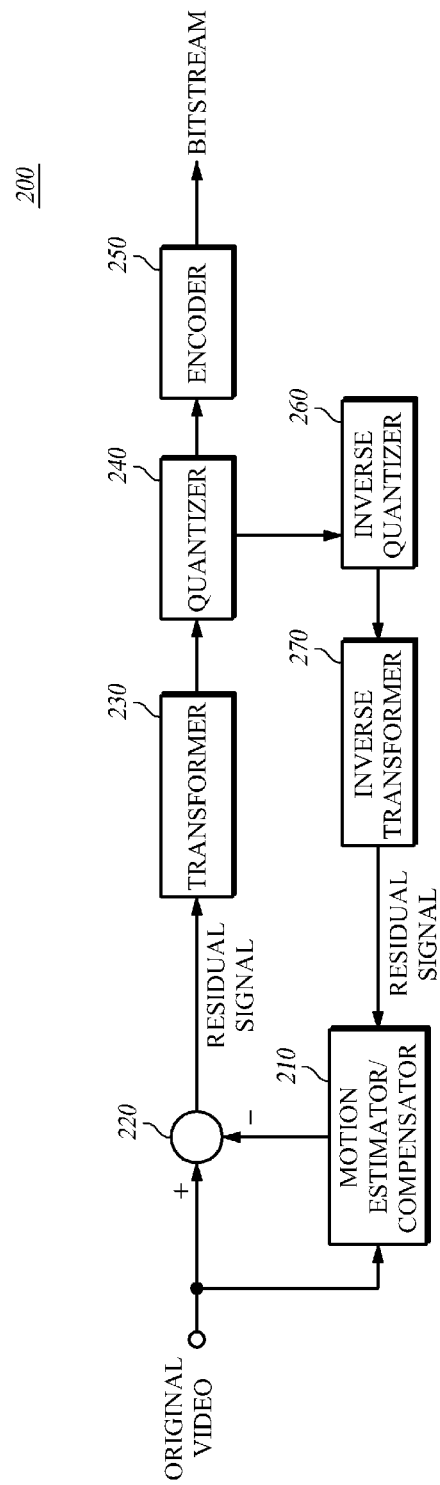
FIG. 2 is a block diagram of a video encoding apparatus according to an aspect.

FIG. 2 is a block diagram for showing a video encoding apparatus 200 according to an aspect.

Referring to FIG. 2, video encoding apparatus (or called encoder) 200 includes a motion estimator/compensator 210, a subtractor 220, a transformer 230, a quantizer 240, and an encoder 250.

Video encoding apparatus 200 may be a personal computer or PC, notebook or laptop computer, personal digital assistant or PDA, portable multimedia player or PMP, PlayStation Portable or PSP, or mobile communication terminal, smart phone or such devices, and represents a variety of apparatuses equipped with, for example, a communication device such as a modem for carrying out communications between various devices or wired/wireless communication networks, a memory for storing various programs for encoding videos and related data, and a microprocessor for executing the programs to effect operations and controls.

As described above, motion estimator/compensator 210 may predict the current block (or macroblock) by using either one or combined both of the motion prediction-based inter prediction and intra prediction for predicting a latter pixel by taking advantage of the correlations among the pixel signals within a single frame.

For example, motion estimator/compensator 210 may be formed by two divided sections of a motion estimator (not shown) and a motion compensator (not shown). The motion estimator searches the predicted value of a motion of the current frame macroblock from the reference frame and outputs their motion difference as a motion vector. In other words, the desired macroblock to find is searched for within a predetermined search area of the reference frame to identify the closest macroblock and its degree of motion is outputted as the motion vector. From the reference frame, the motion compensator gets a predicted macroblock corresponding to the obtained motion vector.

Alternatively, motion estimator/compensator 210 may be an intra predictor which predicts the current macroblock of the current frame by using macroblocks neighboring the current block, and it predicts the predicted macroblock by calculating predicted pixel values of the respective pixels in the current block using one or more pixel values of one or more adjacent macroblocks. Here, the adjacent macroblocks may be one or more macroblocks which were compressed previously of the current macroblock and are neighboring the current macroblock.

Motion estimator/compensator 210 according to the disclosure selects one of the block motion compensation (BMC) and overlapped block motion compensation (OBMC) particularly with respect to the current block pixels, predicts the pixels into predicted pixel values respectively by carrying out the selected motion compensation through carrying out an adaptive overlapped block motion compensation by variable units according to scan modes of 'i' different kinds combined with sampling modes of 'j' different kinds, and determines such modes from the scan modes and sampling modes of 'i×j' different kinds that generate the lowest residual pixel energy to computation cost as an optimal scan mode and a sampling mode, based the result of the adaptive overlapped block motion compensation. The detail of this operation will be described with reference to FIG. 3.

Subtractor 220 subtracts the predicted macroblock from the macroblock of the original video to calculate their difference for generating residual signals.

Transformer 230 transforms the residual signals generated by subtractor 220 into a frequency domain to obtain frequency coefficients. Here, transformer 230 performs the transform into frequency domain by using various techniques including discrete cosine transform (DCT) or wavelet transform that transforms video signals on the time axis to those of the frequency axis. In the case of I frame described with reference to FIG. 1, transformer 230 transforms the macroblocks of the original video into the frequency domain.

Quantizer 240 performs quantization on the frequency coefficients that went through transformation at transformer 230.

A residual signal refers to the macroblock of the original video subtracted by the predicted macroblock, and for the purpose of reducing the data quantity in the encoding operation the value of the residual block is encoded. Because errors are generated during the quantization, the bitstream of video data carries errors occurred through the transform and quantization.

Video encoding apparatus 200 may also incorporate an inverse quantizer 360 and an inverse transformer 370 to obtain the reference frame.

For the purpose of obtaining the reference frame, the quantized residual signal is added to the predicted video from motion estimator/compensator 210 after going through inverse quantizer 360 and inverse transformer 270 and the sum is stored in a reference frame storage unit (not shown). In the case of the I frame, it proceeds through inverse quantizer 360 and inverse transformer 370 and is stored in the reference frame storage unit. In other words, assuming the original video is A and the predicted video is B, transformer 230 receives an input of the difference A-B between the original video and predicted video to perform the transform.

Encoder 250 encodes the quantized frequency coefficients from quantizer 240 into a bitstream. For the encoding, an entropy method may be used although various other unlimited coding techniques are available for use.

Figure 3:
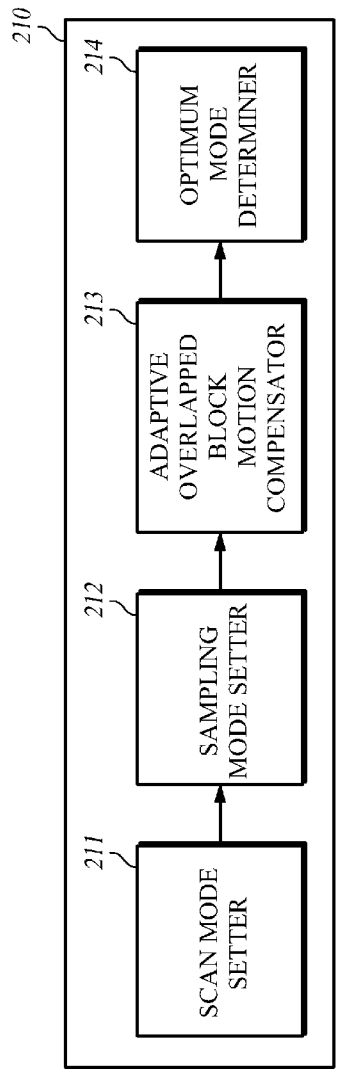
FIG. 3 is a block diagram of an adaptive overlapped block motion compensation apparatus by variable units according to an aspect.

FIG. 3 is a block diagram of an adaptive overlapped block motion compensation apparatus by variable units according to an aspect which corresponds to motion estimator/compensator 210 in FIG. 2 and is referenced by the same number 210.

As illustrated, this aspect of adaptive overlapped block motion compensation apparatus 210 includes a scan mode setter 211, sampling mode setter 212, an adaptive overlapped block motion compensator 213, and an optimum mode determiner 214.

Scan mode setter 211 stores a plurality of scan modes and selects them one by one in a sequence. The detailed explanation on the sampling modes according to the disclosure will be provided.

Sampling mode setter 212 stores a plurality of sampling modes and selects them one by one in a sequence. The detailed explanation on the sampling modes according to the disclosure will be provided.

According to a scan mode selected by scan mode setter 211 and a sampling mode selected by sampling mode setter 212, adaptive overlapped block motion compensator 213 performs the adaptive overlapped block motion compensation by variable units, and in a particular example that scan modes are of 'i' different kinds and sampling modes are of 'j' different kinds, the adaptive overlapped block motion compensation is performed 'i×j' times per subject block in 'i×j' different combined scan modes and sampling modes.

Optimum mode determiner 214, on the ground of the result of 'i×j' times of the adaptive overlapped block motion compensation, determines the mode that generates the lowest residual pixel energy to computation cost among the scan modes and sampling modes of 'i×j' different kinds, as the optimal scan modes and sampling modes. For example, optimum mode determiner 214 determines the mode having a performance valued highest when calculated based on Equation 1 below, as the optimal scan modes and sampling modes. In Equation 1, $\Sigma R(x,y)|$ represents the sum of all the residual pixels generated when performing the adaptive overlapped block motion compensation on the current block, S represents the number of times of carrying out a discriminant for determining BMC/OBMC, and k represents a constant.

$$\text{Performance} = \frac{1}{\sum R(x,\ y) + k \cdot S} \quad \text{(Equation 1)}$$

Figure 4:
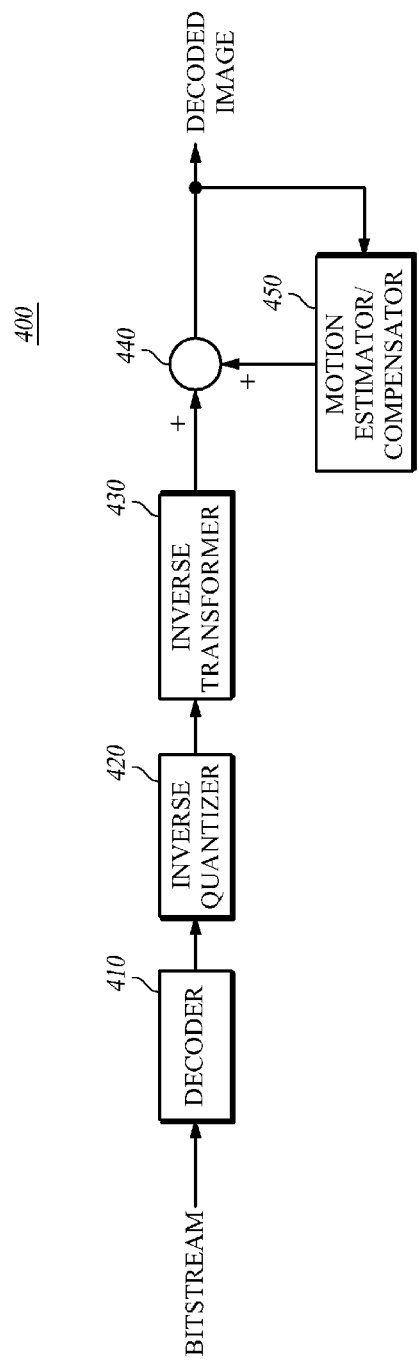
FIG. 4 is a block diagram of a video decoding apparatus according to an aspect.

FIG. 4 is a schematic block diagram of a video decoding apparatus 400 according to an aspect.

As illustrated, video decoding apparatus (or called decoder) 400 in this aspect is for decoding the video by predicting the current block of the video using one or more adjacent blocks of the current block, and includes a decoder 410, an inverse quantizer 420, an inverse transformer 430, an adder 440, and a motion estimator/compensator 450.

As with video encoding apparatus 200 described with reference to FIG. 2, video decoding apparatus 400 may be a personal computer or PC, notebook or laptop computer, personal digital assistant or PDA, portable multimedia player or PMP, PlayStation Portable or PSP, or mobile communication terminal, smart phone or such devices, and may represent a variety of apparatuses equipped with, for example, a communication device such as a modem for carrying out communications between various devices or wired/wireless communication networks, a memory for storing various programs for encoding videos and related data, and a microprocessor for executing the programs to effect operations and controls.

Decoder 410 decodes the bitstream to extract the quantized frequency coefficients. Specifically, decoder 410 decodes the bitstream which is the video encoded by video encoding apparatus 200 and extracts the quantized frequency coefficients which contain pixel information of the video current block.

Inverse quantizer 420 performs a de-quantization with respect to the frequency coefficients extracted from the bitstream by decoder 410.

Inverse transformer 430 inversely transforms the de-quantized frequency coefficients from inverse quantizer 420 into time-domain to generate a residual signal.

Adder 430 adds predicted pixel values of the respective pixels of the current block predicted by motion estimator/compensator 450 to the inversely transformed residual signal to reconstruct the original pixel value of the current block.

Figure 5:
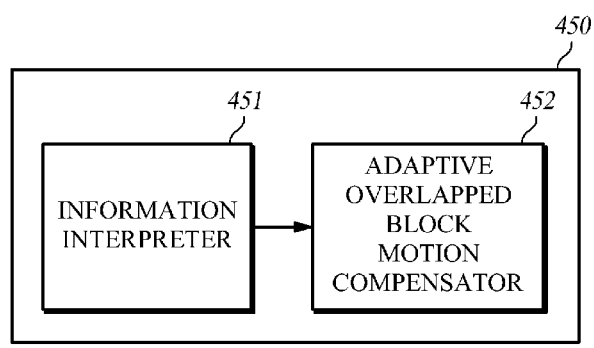
FIG. 5 is a block diagram of an adaptive overlapped block motion compensation apparatus by variable units according to an aspect.

FIG. 5 is a block diagram of an adaptive overlapped block motion compensation apparatus 450 by variable units according to an aspect which corresponds to motion estimator/compensator 450 in FIG. 4 and is referenced by the same number 450.

As illustrated, this aspect of adaptive overlapped block motion compensation apparatus 450 includes an information interpreter 451 and an adaptive overlapped block motion compensator 452.

Information interpreter 451 interprets scan mode information and sampling mode information supplied from encoder 200 to identify what scan mode information and sampling mode information were used for the current block.

Adaptive overlapped block motion compensator 452 operates based on the scan mode information and sampling mode information interpreted by information interpreter 451 to simultaneously perform scanning of the current block in the corresponding scan mode and the adaptive overlapped block motion compensation with respect to the sampled pixels in the corresponding sampling mode.

Figure 6:
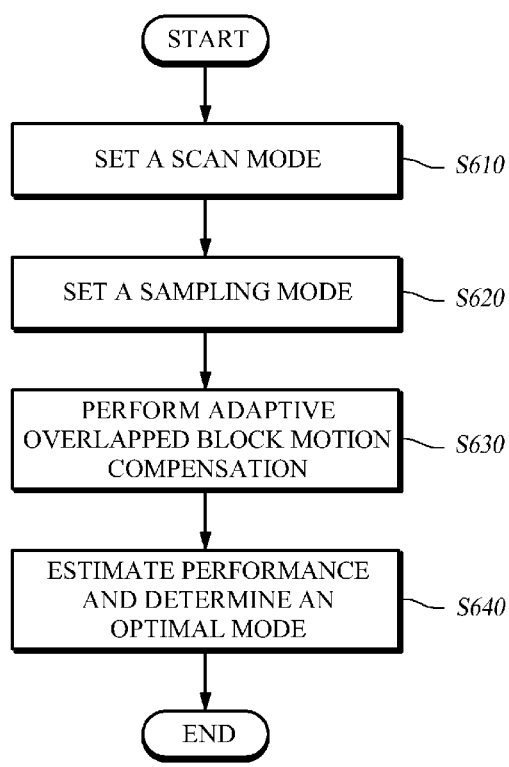
FIG. 6 is a flow diagram for illustrating an adaptive overlapped block motion compensation method by variable units according to an aspect.

FIG. 6 is a flow diagram for illustrating an adaptive overlapped block motion compensation method by variable units according to an aspect, and will be described as operatively applied to motion estimator/compensator 210 of encoder 200 in FIG. 2 corresponding to adaptive overlapped block motion compensation apparatus 210 by variable units in FIG. 3.

This aspect of the adaptive overlapped block motion compensation method by variable units includes steps of setting a scan mode in step S610, setting a sampling mode in step S620, performing an adaptive overlapped block motion compensation in step S630, and estimating performance and determining an optimal mode in step S640.

In step S610 of setting the scan mode, scan mode setter 211 selects one of a plurality of scan modes prepared, and in step S620 of setting the sampling mode, sampling mode setter 212 selects one of a plurality of sampling modes prepared.

In step S630, adaptive overlapped block motion compensator 213 carries out the adaptive overlapped block motion compensation with respect to the current block based on the scan mode and sampling mode set as above.

In step S640 of estimating the performance and determining the optimal mode, on the ground of the result of the adaptive overlapped block motion compensation, optimum mode determiner 214 estimates the computation cost and calculates residual pixel values to estimate the performance to computation cost for the current block. Thereafter, steps S610-S640 are performed in all the possible combinations of the scan mode and the sampling modes and then optimum mode determiner 214 determines the optimum combination of the scan modes and sampling modes that performs the best with respect to the computation cost and carries out the adaptive overlapped block motion compensation.

Figure 8:
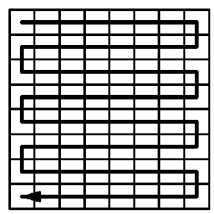
FIG. 8 is a diagram for showing various scan modes according to an aspect.
Figure 8:
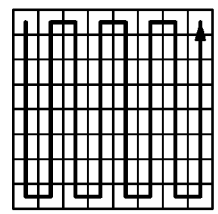
Figure 8:
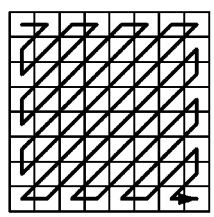
Figure 8:
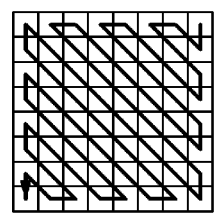
Figure 8:
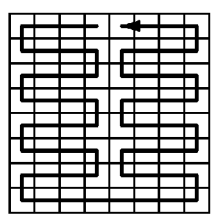
Figure 8:
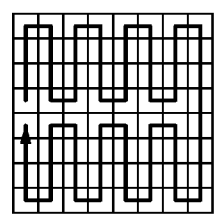
Figure 8:
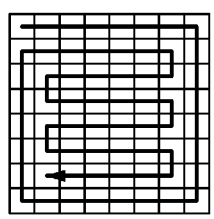
Figure 8:
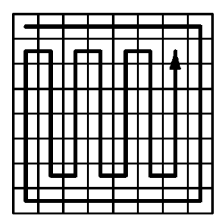

The scan mode according to the present disclosure means a sequence of running the motion compensation through the pixels in a block. Assuming there is an 8×8 block having pixel coordinates from (0, 0) to (7, 7), a determination is made referring to the coordinates one by one whether to adaptively perform the block motion compensations or the overlapped block motion compensations. At this time, the sequenced processing through the coordinates may use the various scan modes 1 to 8 as shown in FIG. 8. The utilization of the scan modes causes the 2-dimensional pixels within the block to be 1-dimensional, and the arranged order of the pixels changes by the scan mode.

The sampling mode according to the present disclosure is to determine, upon determining the scan mode, whether to adaptively perform the block motion compensations or the overlapped block motion compensations skipping some pixels in the scanning direction at a time. For example, if it is desirable to perform a sampling with respect to every pixel in the block, the determination of the block motion compensation method is in the direction set in the scan mode through the sampling mode by an expression of n (n=0, 1, 2, ...) while if it is desirable to perform a sampling with respect to every three pixels in the block, the determination of the block motion compensation method is in the direction set in the scan mode through the sampling mode by an expression of 3n (n=0, 1, 2, ...).

Adaptive overlapped block motion compensator 213 according to the present disclosure, based on the determined modes by scan mode setter 211 and sampling mode setter 212, processes the respective pixels with the adaptive block motion compensation or the overlapped block motion compensation. When scanning with the scan mode, it is decided whether the first pixel takes the block motion compensation or the overlapped block motion compensation. At this time, the determining formula used must be reproducible at a decoder. The first pixel is followed by a pixel at a next location in the determination of the motion compensation method. At this time, the next locations are determined by the sampling mode, and if for instance the sampling mode employed uses the expression of 3n (n=0, 1, 2, 3, ...), the pixels that are 1-dimensionally arranged via the scan mode and located at 0, 3, 6, 9, ... are first subject to a discriminant before the determination of the motion compensation method. At the same time, if it is determined that the 0th pixel receives the overlapped motion compensation and the 3rd pixel receives the overlapped motion compensation, the overlapped motion compensation is performed with respect to the 1st and 2nd pixels that are not subject to the discriminant. If it is determined that the 0th, 3rd, and 6th pixels receive the overlapped motion compensation and that the 9th pixel receives the block motion compensation, the 9th pixel is renumbered as the 0th pixel, and such 9th and reset 0th pixel to pixels of 3n (n=0, 1, 2, ...) are sampled so that the adaptive overlapped block motion compensation is performed in the same manner. The specific aspect will be described.

Optimum mode determiner 214 according to the present disclosure estimates a performance by calculating the value of a residual pixel energy to computation cost generated when performing the adaptive overlapped block motion compensation with the current scan mode and sampling mode. At this time, the computation cost may be judged by however many times a BMC/OBMC discriminant is applied against the block. In the encoder, all of the scan modes and sampling modes are performed, and the mode is determined that generates the lowest residual pixel energy as well as the computation cost, performing the adaptive overlapped block motion compensation.

For example, if preset scan modes by the number of 'i' and preset sampling modes by the number of 'j' are prepared, there are 'i×j' types of optimum adaptive overlapped block motion compensation needed to be performed in the encoder. The encoder applies the described method 'i×j' times to find the motion compensation method estimated to have the optimum performance and delivers information on the scan mode and sampling mode to the decode, which then uses the information received so as to set the scan mode and sampling mode and follow suit the encoder performing the adaptive overlapped block motion compensation.

Figure 7:
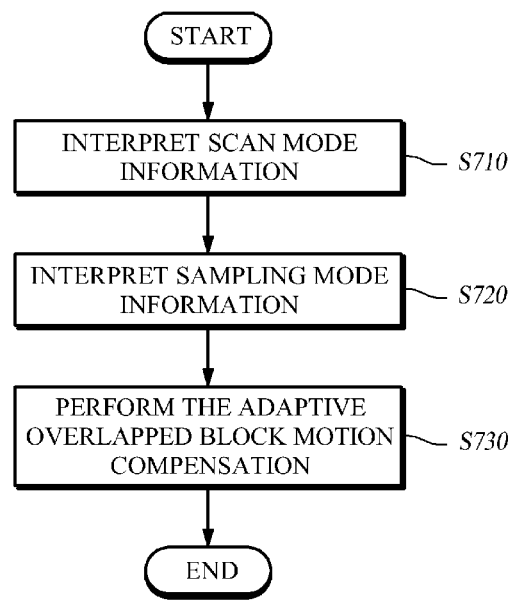
FIG. 7 is a flow diagram for illustrating an adaptive overlapped block motion compensation method by variable units according to another aspect.

FIG. 7 is a flow diagram for illustrating an adaptive overlapped block motion compensation method by variable units according to another aspect, and will be described as applied to motion estimator/compensator 450 of decoder 400 in FIG. 4 corresponding to adaptive overlapped block motion compensation apparatus 450 by variable units in FIG. 5.

This aspect of the adaptive overlapped block motion compensation method by variable units as shown includes steps of analyzing scan mode information S710, analyzing sampling mode information S720, and performing the adaptive overlapped block motion compensation S730.

In step S710 of analyzing scan mode information and step S720 of analyzing sampling mode information, information interpreter 451 analyzes the scan mode information and sampling mode information delivered from encoder 200 to determine the scan mode and sampling mode of the current block.

Subsequently, in step S730 of performing the adaptive overlapped block motion compensation, adaptive overlapped block motion compensator 452 scans the current block in the scan mode determined above as it performs the adaptive overlapped block motion compensation on the pixel sampled in the sampling mode determined above.

Now, a particular example of the present disclosure will be presented to facilitate a more specific understanding of the above description.

For the purpose of the specific description, the overlapped block motion compensation technique of H.263 ("Video coding for low bit rate communication", Draft, ITU-T Recommendation H.263, September 1997) will be first discussed.

The overlapped block motion compensation by H.263 is accomplished in units of 8×8 block through a calculation of Equation 2:

$$p(x, y) = \left[ q(x, y) \cdot H_C(x, y) + \sum_N r_N(x, y) \cdot H_N(x, y) + 4 \right] / 8 \quad \text{(Equation 2)}$$

Here, p(x,y) means a motion compensated pixel value to be generated by the overlapped block motion compensation, and coordinates (x,y) indicate the locations of pixels in the 8×8 block and have values 0 to 7 with the top left location of the block being (0,0). In addition, q(x,y) means a motion compensated pixel value of the 8×8 block subject to the current reconstruction and it is obtained through Equation 3 if the motion vector received via transmission for the current block $(MV_C^x, MV_C^y)$:

$$q(x,y) = f_{t-1}(x + (MV_C^x + MV_C^y)) \quad \text{[Equation 3]}$$

Here, $f_{t-1}(x,y)$ means the pixel values of the previously reconstructed image at locations (x,y).

In Equation 2, N indicates neighboring blocks of the block subject to a current reconstruction and is valued T, B, L, or R representing indices of blocks neighboring the current block at its top, bottom, left, and right boundaries, respectively. Therefore, when N=T is given, $r_N(x,y)$ is obtained as with $r_T(x,y) = f_{t-1}(x + (MV_T^x, y + MV_T^y))$, where $(MV_T^x, MV_T^y)$ means a motion vector received via transmission for the top adjacent block to the current block. Similarly, for other values of N, it is also possible to obtain $T_N(x,y)$ by using motion vectors of the neighboring blocks and the previously reconstructed image. Finally, in Equation 2, $H_C(x,y)$ and $H_N(x,y)$| represent weights located at (x,y) and multiplied by q(x,y), a block of pixels reconstructed into the motion vector of the current block and by $r_N(x,y)$, a block of pixels reconstructed into the motion vector of the neighboring block.

As described above, the overlapped block motion compensation method by H.263 uses the statistically optimized fixed weight matrix to perform motion compensations for every 8×8 block via Equation 2 and thereby noticeably reduces the block effect relatively to its prior art block motion compensations. However, the reconstructed image will have partial blocks that generate significantly degraded residual signals compared to the prior art block motion compensations, and the conventional techniques stated initially merely amount to setting the respectively proprietary criteria for identifying such partial blocks. Further, even with the blocks through the overlapped block motion compensation which may seem to be excellent over those through the block motion compensation, it is visible that not all of the neighboring boundary blocks positively affect the results of the overlapped block motion compensation, which suggests the necessity of an adaptive application of the overlapped block motion compensation by units of block boundary not of block or by more refined units of pixel for the purpose of the performance enhancement. However, the application of the overlapped block motion compensation in the pixel scale needs the determination of whether to have all of the pixels constituting the image go through the overlapped block motion compensation, which entails excessive computations. Particularly, the implementations of the decoder by PC, notebook or laptop computer, PDA, PMP, PlayStation Portable or PSP, or mobile communication terminal have a limited operation capacity and get into troubles with their implementations in the case of a high computational complexity on the decoder and thus reducing the decoder computing complexity is critical.

Since the pixels in a block are grouped in numbers to shape a same object and the pixel groups each makes a grouped movement with one accord, it is correct to process each pixel group through a same motion compensation method. Therefore, if the component pixels of the block are arranged so that the pixels constituting the same object are in series, then it becomes possible to perform an adaptive overlapped block motion compensation with respect to separately composed pixels in numbers. In this respect, the present disclosure enables the adaptive overlapped block motion compensation by variable units by providing a number of scanning method so that the pixels are grouped by variable units according to object locations and its motion characteristics within a block and by providing a number of sampling methods to allow the sampling in appropriate units. This enables performing an effective overlapped block motion compensation with less computation quantity than that of performing the adaptive overlapped block motion compensation in the units of pixel.

Now, an operation of a specific aspect of the disclosure is described.

The variable unit adaptive overlapped motion compensator 210 of the present disclosure runs the plurality of scan modes and the plurality of sampling modes through the suggested adaptive overlapped motion compensation and determines the best performing mode therefrom.

The scan modes may be prepared by encoder 200 in 'i' different kinds considering the location and size of the object in the block. At this time, information on the scan modes must be transmitted to decoder 400, which gives the information quantity of logi bits when there are 'i' kinds of scan mode prepared. Because preparation of more scan modes requires the adaptive overlapped motion compensation with respect to the extra modes increasing the computational complexity and the extra information quantity, the scan modes are prepared in an appropriate number.

Adjacent pixels in the block may have a high probability of shaping a same object in an image so that they have a common motion. This leads to the ground that the pixels adjacent to the current block receive a same motion compensation method. In addition, since a block may contain different objects having a common motion at various locations, orienting the scan to have the pixels of the same object arranged in series possibly obviates the need to determine the motion compensation method with respect to the entire pixels but may allow the motion compensation to be simply applied to pixels grouped in units of several of the pixels.

The sampling modes may be prepared by sampling mode setter 212 in 'j' different kinds such as n, 2n, 3n, $n^2$, $2^n$ (n=0, 1, 2, 3 . . . ). If the sampling mode is n, the same method as the pixel unit adaptive overlapped motion compensation applies. As with the scan modes, the sampling modes are prepared in an appropriate number.

Applying various sampling modes enables the adaptive overlapped motion compensation to be performed by pixels grouped by variable units of several pixels rather than fixed units of, for example, pixels, block boundaries, or blocks.

For example, when applying the present disclosure to an 8×8 block, rearranging the pixels into 1-dimension by using the scan mode 1 in FIG. 8 gives (0,0)→(0,1)→(0,2)→(0,3)→(0,4)→(0,5)→(0,6)→(0,7)→(1,7)→(1,6)→(1,5)→(1,4)→(1,3)→ . . . →(1,7)→(0,7).

Figure 9:
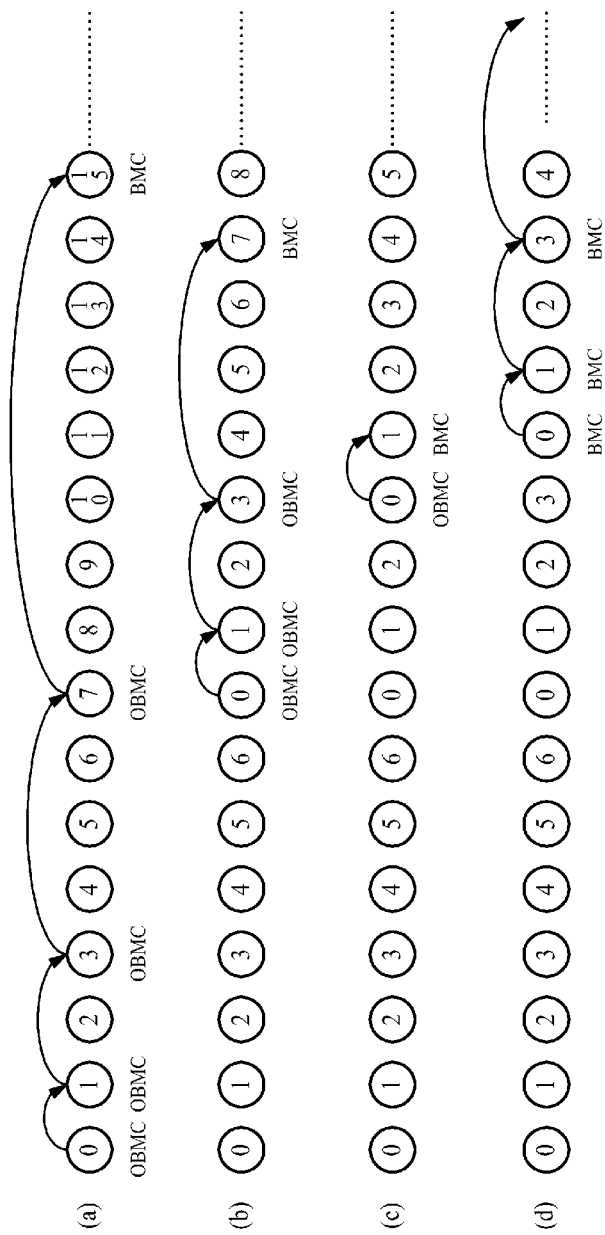
FIG. 9 is an illustration of an exemplary sampling mode.

After the 1-dimensional rearrangement with the scan mode, when using the sampling mode of $2^n-1$ (n=0, 1, 2, 3 . . . ), it is possible to perform the adaptive overlapped motion compensation as in a method of FIG. 9.

In FIG. 9, an 8×8 block at (a) may have pixels that are numbered 0~63.

In FIG. 9 at (a), using the sampling mode of $2^{n-1}$ (n=0, 1, 2, 3 . . . ), BMC/OBMC determinations are made for the pixels numbered 0, 1, 3, 7, and 15. Here, OBMC was determined for numbers 1 and 3 leading to an assumption that pixels 1, 2, and 3 shape a same object and OBMC is performed on pixel 2 skipping the BMC/OBMC determination on pixel 2.

Likewise, numbers 1 and 3 were determined to undergo OBMC leading to an assumption that pixels 4, 5, and 6 shape a common object and these pixels are motion compensated by OBMC.

Here, number 7 gets OBMC as number 15 gets BMC, and pixels 7 and 15 have a boundary present therebetween along with a transition from OBMC to BMC.

At this time of transition from OBMC to BMC, the involved pixels and their intermediate pixels receive an initialization of the sampling mode of $2^n-1$ and then a motion compensation. In other words as in FIG. 9 at (b), pixel 7 is renumbered 0 and subject to $2^n-1$ (n=0, 1, 2, 3 . . . ) and the motion compensation is repeated.

Because the OBMC to BMC transition occurs when proceeding from pixel 3 to pixel 7 in FIG. 9 at (b), pixel 3 is renumbered 0 and the motion compensation is repeated with $2^n-1$ (n=0, 1, 2, 3 . . . ) applied.

In FIG. 9 at (c), the OBMC to BMC transition occurs when proceeding from pixel 0 to pixel 1 where is the boundary of the object.

In FIG. 9 at (d), pixel 1 at (c) is renumbered 0 and the motion compensation is repeated with $2^n-1$ (n=0, 1, 2, 3 . . . ) applied.

When this method is performed with respect to 64 pixels, it is possible to complete performances of the overlapped motion compensation adaptively with respect to the entire pixels there are.

When the adaptive overlapped motion compensations are performed in the above method, it is possible to estimate the computation cost by using the number of the samplings performed to decide BMC/OBMC, and the value of a residual pixel energy is an index for indicating a performance in terms of the compression efficiency. Using Equation 4 with the two values considered appropriately, the performance may be estimated.

$$\text{Performance} = \left| \frac{1}{\sum R(x, y) + k \cdot S} \right| \quad \text{(Equation 4)}$$

In Equation 4, ΣR(x,y)| represents the sum of the entire residual pixels generated when performing the adaptive overlapped block motion compensation on the current block, and the smaller the sum the higher the performance for the mode set. In addition, S represents the number of times of carrying out a discriminant for determining BMC/OBMC. As the number gets smaller, less computation is generated for the BMC/OBMC decision, which means a low computation complexity but the performance is so excellent for the mode set.

k is a constant which, when it is set to a large value, allows estimating the performance with a weight given on less generated computational quantity, and when it is set to a small value, estimates the performance with more weight given on the compression efficiency than the computational quantity.

Figure 10:
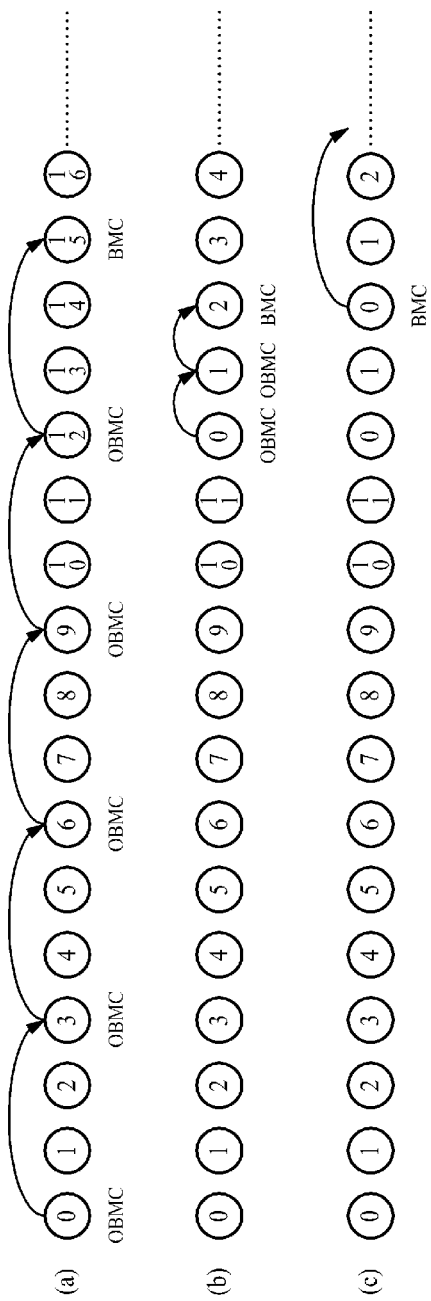
FIG. 10 is an illustration of another exemplary sampling mode.

FIG. 10 shows the process of performing the adaptive overlapped block motion compensation when the sampling mode is 3n(n=0, 1, 2, . . . ).

Step (a) in FIG. 10 performs the sampling for the pixels numbered 0, 3, 6, 9, 12, 15 . . . to make BMC/OBMC determinations that the pixels 0, 3, 6, 9, and 12 are processed by OBMC concluding that the pixels 1, 2, 4, 5, 7, 8, 10, and 11 are of a same object with a same motion and these pixels are OBMC to proceed with.

It can be seen in FIG. 10 at (a) that the OBMC to BMC transition occurs when proceeding from pixel 12 to pixel 15. Therefore, determining BMC/OBMC with respect to n(n=0, 1, 2, 3) with pixel 12 renumbered 0 as in (b) will tell the pixel at new 2 got the transition to BMC which is considered to be the location of a boundary.

In FIG. 10 at (c), the BMC transitioned pixel 2 is renumbered 0 and the same process as above is repeated by using the sampling mode of 3n(n=0, 1, 2, . . . ) to perform the adaptive overlapped motion compensations with respect to 64 pixels. At this time also, it is possible to estimate the performance with an application of Equation 4.

The above method is performed with respect to the scan mode of 'i' kinds and the sampling modes of 'j' kinds to estimate the performance and determine the best values as the modes for the block.

Decoder 400 will be able to perform the adaptive overlapped motion compensation by using the scan mode and the sampling mode determined to be the best modes in encoder 200.

In the present disclosure, the discriminant for BMC/OBMC accepts the application of the conventional methods.

In the description above, although the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure.

As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from essential characteristics of the disclosure. Therefore, exemplary embodiments of the present disclosure have not been described for limiting purposes. Accordingly, the scope of the disclosure is not to be limited by the above embodiments but by the claims and the equivalents thereof.

INDUSTRIAL APPLICABILITY

As described above, the present disclosure is highly useful for application in a video encoding/decoding techniques to allow utilization of the adaptive overlapped motion compensations by variable units causing a less computation quantity to greatly reduce the residual signal energy of the block to be encoded to enhance the compression performance of the video compression apparatus significantly, and eventually generates improved video quality for the bits (or information quantity) used.

The invention claimed is:

1. An adaptive overlapped block motion compensation apparatus by variable units, the apparatus comprising:
    a scan mode setter configured to select one of 'i' kinds of preset scan modes;
    a sampling mode setter configured to select one of 'j' kinds of preset sampling modes;
    an adaptive overlapped block motion compensator configured to
        scan a current block according to the selected scan mode,
        perform a sampling out of scanned pixels according to the selected sampling mode,
        perform an adaptive overlapped block motion compensation on the sampled pixels in 'i' times 'j' (i×j) combinations of selected scan modes and selected sampling modes, and
        perform motion compensations for unsampled remaining pixels according to the result of the adaptive overlapped block motion compensation; and
    an optimum mode determiner configured to determine a scan mode and a sampling mode from the 'i' times 'j' (i×j) combinations of the selected scan modes and the selected sampling modes that generate least residual pixel energy to computation cost as an optimum scan mode and an optimum sampling mode, based on a result of the adaptive overlapped block motion compensation,
    wherein the adaptive overlapped block motion compensation includes
    (1) performing a first adaptive overlapped block motion compensation for conducting block motion compensations (BMC) or overlapped block motion compensations (OBMC) on pixels sampled out of the scanned pixels in the selected sampling modes, and (2) performing a sampling in the selected sampling mode and a second adaptive overlapped block motion compensation on the pixels extending from a leading sampled pixel to a trailing sampled pixel, when the performing of the first adaptive overlapped block motion compensation results in occurring transitions between BMC and OBMC in the leading sampled pixel and the trailing sampled pixel and one or more scanned pixels exist between the leading sampled pixel and the trailing sampled pixel, wherein the leading sampled pixel and the trailing sampled pixel are sampled adjacently to each other.

2. The adaptive overlapped block motion compensation apparatus by variable units of claim 1, wherein the adaptive overlapped block motion compensator is configured to perform a sampling in the selected sampling modes and the first adaptive overlapped block motion compensation on pixels extending from the trailing sampled pixel, when the performing of the second adaptive overlapped block motion compensation results in occurring transitions between BMC and OBMC in the leading sampled pixel and the trailing sampled pixel, wherein the trailing sampled pixel is neighboring the leading sampled pixel.

3. The adaptive overlapped block motion compensation apparatus by variable units of claim 1, wherein the adaptive overlapped block motion compensator is configured to perform an identical motion compensation on pixels extending from a leading sampled pixel to a trailing sampled pixel, when the performing of the first adaptive overlapped block motion compensation does not result in occurring transitions between BMC and OBMC in the leading sampled pixel and the trailing sampled pixel and one or more scanned pixels exist between the leading sampled pixel and the trailing sampled pixel.

4. The adaptive overlapped block motion compensation apparatus by variable units of claim 1, wherein the optimum mode determiner is configured to determine modes with a highest valued performance calculated from an expression of $$\text{Performance} = \frac{1}{\sum R(x, y) + k \cdot S}$$

to be the optimum scan mode and the optimum sampling mode where $\Sigma R(x,y)$ represents the sum of all residual pixels generated when performing an adaptive overlapped block motion on the current block, S represents a number of times of carrying out a discriminant for determining BMC/OBMC, and k represents a constant.

5. The adaptive overlapped block motion compensation apparatus by variable units of claim 4, wherein the constant k is determined in consideration of a ratio of compression efficiency to a computation cost.

6. An adaptive overlapped block motion compensation method by variable units comprising:

selecting one of 'i' kinds of preset scan modes;
selecting one of 'j' kinds of preset sampling modes;
scanning a current block according to the selected scan mode;
performing a sampling out of scanned pixels according to the selected sampling mode;
performing an adaptive overlapped block motion compensation on the sampled pixels in 'i' times 'j' (i×j) combinations of selected scan modes and selected sampling modes;

performing motion compensations for unsampled remaining pixels according to the result of the adaptive overlapped block motion compensation; and determining a scan mode and a sampling mode from the 'i' times 'j' (i×j) combinations of the selected scan modes and the selected sampling modes that generate the least residual pixel energy to computation cost as an optimum scan mode and an optimum sampling mode, based on a result of the adaptive overlapped block motion compensation, wherein the adaptive overlapped block motion compensation includes (1) performing a first adaptive overlapped block motion compensation for conducting block motion compensations (BMC) or overlapped block motion compensations (OBMC) on pixels sampled out of the scanned pixels in the selected sampling modes, and (2) performing a sampling in the selected sampling mode and a second adaptive overlapped block motion compensation on the pixels extending from a leading sampled pixel to a trailing sampled pixel, when the performing of the first adaptive overlapped block motion compensation results in occurring transitions between BMC and OBMC in the leading sampled pixel and the trailing sampled pixel and one or more scanned pixels exist between the leading sampled pixel and the trailing sampled pixel, wherein the leading sampled pixel and the trailing sampled pixel are sampled adjacently to each other.

7. The adaptive overlapped block motion compensation method by variable units of claim 6, wherein the step of performing the adaptive overlapped block motion compensation by variable units includes:

performing a sampling in the selected sampling modes and a first adaptive overlapped block motion compensation on pixels extending from the trailing sampled pixel, when the performing of the second adaptive overlapped block motion compensation results in occurring transitions between BMC and OBMC in the leading sampled pixel and the trailing sampled pixel, wherein the trailing sampled pixel is neighboring the leading sampled pixel.

8. The adaptive overlapped block motion compensation method by variable units of claim 6, wherein the step of performing the adaptive overlapped block motion compensation by variable units includes:

performing an identical motion compensation on pixels extending from a leading sampled pixel to a trailing sampled pixel, when the performing of the first adaptive overlapped block motion compensation does not result in occurring transitions between BMC and OBMC in the leading sampled pixel and the trailing sampled pixel and one or more scanned pixels exist between the leading sampled pixel and the trailing sampled pixel.

9. The adaptive overlapped block motion compensation method by variable units of claim 6, wherein the step of determining the optimum scan mode and the optimum sampling mode determines modes with a highest valued performance calculated from an expression of $$\text{Performance} = \frac{1}{\sum R(x, y) + k \cdot S}$$

to be the optimum scan mode and the optimum sampling mode wherein $\Sigma R(x,y)$ represents the sum of all residual pixels generated when performing an adaptive overlapped block motion on the current block, S represents a number of times of carrying out a discriminant for determining BMC/OBMC, and k represents a constant.

10. The adaptive overlapped block motion compensation method by variable units of claim 9, wherein the constant k is determined in consideration of a ratio of compression efficiency to a computation cost.

11. A video encoding apparatus comprising:
a motion estimator and compensator configured to
select one of a block motion compensation (BMC) and an overlapped block motion compensation (OBMC) with respect to pixels of a current block, and predict the pixels into predicted pixel values respectively by
(1) selecting one from 'i' kinds of preset scan modes, scanning a current block according to a selected scan mode, a selecting one from 'j' kinds of preset sampling modes, performing a sampling out of the scanned pixels according to a selected sampling mode, and performing an adaptive overlapped block motion compensation on the sampled pixels according to 'i' kinds of scan modes combined with 'j' kinds of sampling modes,
(2) performing motion compensations for unsampled remaining pixels according to the result of the adaptive overlapped block motion compensation,
(3) determining a scan mode and a sampling mode from 'i' times 'j' (i×j) combinations of the scan modes and the sampling modes that generate the lowest residual pixel energy to computation cost as an optimal scan mode and a sampling mode, and
(4) generating the predicted pixel values according to the determination of the scan mode and the sampling mode;
a subtractor configured to subtract the predicted pixel values respectively of the pixels of the current block from original pixel values respectively of the pixels of the current block to calculate differences for generating residual signals;
a transformer configured to transform the residual signals into frequency coefficients;
a quantizer configured to quantize the frequency coefficients; and
an encoder configured to encode quantized frequency coefficients into a bitstream,
wherein the adaptive overlapped block motion compensation includes
(1) performing a first adaptive overlapped block motion compensation for conducting block motion compensations (BMC) or overlapped block motion compensations (OBMC) on pixels sampled out of the scanned pixels in the selected sampling modes, and
(2) performing a sampling in the selected sampling mode and a second adaptive overlapped block motion compensation on the pixels extending from a leading sampled pixel to a trailing sampled pixel, when the performing of the first adaptive overlapped block motion compensation results in occurring transitions between BMC and OBMC in the leading sampled pixel and the trailing sampled pixel and one or more scanned pixels exist between the leading sampled pixel and the trailing sampled pixel,
wherein the leading sampled pixel and the trailing sampled pixel are sampled adjacently to each other.

12. A video decoding apparatus comprising:
an information interpreter configured to perform interpretations of scan mode information and sampling mode information of a current block from a bitstream; and
an adaptive overlapped block motion compensator configured to
perform a scan on the current block according to the interpreted scan mode information,
perform a sampling out of scanned pixels according to the interpreted sampling mode information,
perform an adaptive overlapped block motion compensation with respect to sampled pixels, and
perform motion compensations for unsampled remaining pixels according to the result of the adaptive overlapped block motion compensation,
wherein the adaptive overlapped block motion compensation includes
(1) performing a first adaptive overlapped block motion compensation for conducting block motion compensations (BMC) or overlapped block motion compensations (OBMC) on pixels sampled out of the scanned pixels in the selected sampling modes, and
(2) performing a sampling in the selected sampling mode and a second adaptive overlapped block motion compensation on the pixels extending from a leading sampled pixel to a trailing sampled pixel, when the performing of the first adaptive overlapped block motion compensation results in occurring transitions between BMC and OBMC in the leading sampled pixel and the trailing sampled pixel and one or more scanned pixels exist between the leading sampled pixel and the trailing sampled pixel,
wherein the leading sampled pixel and the trailing sampled pixel are sampled adjacently to each other.

13. The video decoding apparatus of claim 12, wherein the adaptive overlapped block motion compensator is configured to perform a sampling according to the interpreted sampling mode information and a first adaptive overlapped block motion compensation on pixels extending from the trailing sampled pixel, when the performing of the second adaptive overlapped block motion compensation results in occurring transitions between BMC and OBMC in the leading sampled pixel and the trailing sampled pixel, wherein the trailing sampled pixel is neighboring the leading sampled pixel.

14. The video decoding apparatus of claim 12, wherein the adaptive overlapped block motion compensator is configured to
to perform an identical motion compensation on pixels extending from a leading sampled pixel to a trailing sampled pixel, when the performing of the first adaptive overlapped block motion compensation does not result in occurring transitions between BMC and OBMC in the leading sampled pixel and the trailing sampled pixel and one or more scanned pixels exist between the leading sampled pixel and the trailing sampled pixel.

15. A video decoding method comprising:
performing an interpretation of scan mode information of a current block from a bitstream;
performing an interpretation of sampling mode information of the current block;
performing a scan on the current block according to the interpreted scan mode information;
performing a sampling out of scanned pixels according to the interpreted sampling mode information;
performing an adaptive overlapped block motion compensation with respect to sampled pixels; and
performing motion compensations for unsampled remaining pixels according to the result of the adaptive overlapped block motion compensation, wherein the adaptive overlapped block motion compensation includes
(1) performing a first adaptive overlapped block motion compensation for conducting block motion compensations (BMC) or overlapped block motion compensations (OBMC) on pixels sampled out of the scanned pixels in the selected sampling modes, and
(2) performing a sampling in the selected sampling mode and a second adaptive overlapped block motion compensation on the pixels extending from a leading sampled pixel to a trailing sampled pixel, when the performing of the first adaptive overlapped block motion compensation results in occurring transitions between BMC and OBMC in the leading sampled pixel and the trailing sampled pixel and one or more scanned pixels exist between the leading sampled pixel and the trailing sampled pixel,
wherein the leading sampled pixel and the trailing sampled pixel are sampled adjacently to each other.

16. The video decoding method of claim 15, wherein the step of performing the adaptive overlapped block motion compensation includes:

performing a sampling according to the interpreted sampling mode information and a first adaptive overlapped block motion compensation on pixels extending from the trailing sampled pixel, when the performing of the second adaptive overlapped block motion compensation results in occurring transitions between BMC and OBMC in the leading sampled pixel and the trailing sampled pixel, wherein the trailing sampled pixel is neighboring the leading sampled pixel.

17. The video decoding method of claim 15, wherein the step of performing the adaptive overlapped block motion compensation includes:

performing an identical motion compensation on pixels extending from a leading sampled pixel to a trailing sampled pixel, when the performing of the first adaptive overlapped block motion compensation does not result in occurring transitions between BMC and OBMC in the leading sampled pixel and the trailing sampled pixel and one or more scanned pixels exist between the leading sampled pixel and the trailing sampled pixel.

\* \* \* \* \*